US008977012B2

(12) United States Patent
Ioffe et al.

(10) Patent No.: US 8,977,012 B2
(45) Date of Patent: Mar. 10, 2015

(54) IMAGE DENOISING SYSTEM AND METHOD (71) Applicant: Google Inc., Mountain View, CA (US)

(72) Inventors: Sergey Ioffe, Mountain View, CA (US);
Troy Chinen, Neward, CA (US); Vivek Kwatra, Mountain View, CA (US); Hui Fang, Mountain View, CA (US); Yichang Shih, San Jose, CA (US)

(73) Assignee: Google Inc., Mountain View, CA (US)

( * ) Notice: Subject to any disclaimer, the term of this patent is extended or adjusted under 35 U.S.C. 154(b) by 160 days.

(21) Appl. No.: 13/665,449

(22) Filed: Oct. 31, 2012

(65) Prior Publication Data
US 2014/0119664 A1 May 1, 2014

(51) Int. Cl.
*G06K 9/00* (2006.01)
*G06K 9/40* (2006.01)

(52) U.S. Cl.
USPC ............................ 382/118; 382/254; 382/264

(58) Field of Classification Search
CPC ...... G06K 9/40; G06K 9/00221; G06T 5/002; G06T 2207/20028
USPC ........................................................ 382/118
See application file for complete search history.

(56) References Cited

U.S. PATENT DOCUMENTS

| 6,345,109 | B1 | 2/2002 | Souma et al. | |
|---|---|---|---|---|
| 7,027,622 | B2 * | 4/2006 | Pengwu | 382/118 |
| 7,756,343 | B2 | 7/2010 | Li et al. | |
| 7,889,949 | B2 * | 2/2011 | Cohen et al. | 382/299 |
| 8,009,880 | B2 * | 8/2011 | Zhang et al. | 382/118 |
| 8,194,939 | B2 | 6/2012 | Perlmutter et al. | |
| 8,254,647 | B1 * | 8/2012 | Nechyba et al. | 382/118 |
| 8,311,319 | B2 * | 11/2012 | Shiell et al. | 382/159 |
| 8,331,698 | B2 * | 12/2012 | Li | 382/224 |
| 8,442,330 | B2 * | 5/2013 | Tong et al. | 382/228 |
| 8,599,289 | B2 * | 12/2013 | Hong | 348/241 |
| 2007/0177817 | A1 * | 8/2007 | Szeliski et al. | 382/275 |
| 2008/0181507 | A1 | 7/2008 | Gope et al. | |
| 2009/0262987 | A1 | 10/2009 | Ioffe et al. | |
| 2011/0043610 | A1 | 2/2011 | Ren et al. | |
| 2011/0148868 | A1 | 6/2011 | Chang et al. | |

FOREIGN PATENT DOCUMENTS

JP 2007128467 A 5/2007
WO 2008150285 A1 12/2008

OTHER PUBLICATIONS

Shengjun Xin, Haizhou Ai "Face Alignment Under Various Poses and Expressions" Affective Computing and Intelligent Interaction Lecture Notes in Computer Science vol. 3784, 2005, pp. 40-47.*

(Continued)

*Primary Examiner* — Utpal Shah (57) ABSTRACT

A method, computer program product, and computer system for identifying a first portion of a facial image in a first image, wherein the first portion includes noise. A corresponding portion of the facial image is identified in a second image, wherein the corresponding portion includes less noise than the first portion. One or more filter parameters of the first portion are determined based upon, at least in part, the first portion and the corresponding portion. At least a portion of the noise from the first portion is smoothed based upon, at least in part, the one or more filter parameters. At least a portion of face specific details from the corresponding portion is added to the first portion.

20 Claims, 5 Drawing Sheets

(56) References Cited

OTHER PUBLICATIONS

Ce Liu; Heung-Yeung Shum; Chang-Shui Zhang, "A two-step approach to hallucinating faces: global parametric model and local nonparametric model," Computer Vision and Pattern Recognition, 2001. CVPR 2001. Proceedings of the 2001 IEEE Computer Society Conference on , vol. 1, no., pp. I-192,I-198 vol. 1, 2001.*

ISR and the Written Opinion of the International Search Authority mailed Jan. 29, 2014 in related application PCT/US2013/067645.

* cited by examiner

IMAGE DENOISING SYSTEM AND METHOD

TECHNICAL FIELD

This disclosure relates to image denoising systems and methods.

BACKGROUND

Video images and still picture images may be taken at, e.g., social events and other functions. Depending on the quality of the device capturing the video, as well as other environmental conditions such as low light conditions, the image quality may be degraded by the presence of noise. Noise (e.g., image noise), may broadly be described to include but not limited to, e.g., random variations of brightness or color information in the image that is not present in the actual object captured in the image. Noise may be particularly evident on the facial regions of those in the images. While some denoising techniques (e.g., neighborhood filtering) may be used to reduce the presence of image noise, the end result may be facial images that are too "flat" and may not look realistic.

SUMMARY OF DISCLOSURE

In one implementation, a method, performed by one or more computing devices, comprises identifying, by a computing device, a first portion of a facial image in a first image, wherein the first portion includes noise. A corresponding portion of the facial image is identified in a second image, wherein the corresponding portion includes less noise than the first portion. A noise level across the first portion and the corresponding portion is determined. At least a portion of the noise from the first portion is smoothed based upon, at least in part, the noise level. At least a portion of face specific details from the corresponding portion is added to the first portion.

In one implementation, a method, performed by one or more computing devices, comprises identifying, by a computing device, a first portion of a facial image in a first image, wherein the first portion includes noise. A corresponding portion of the facial image is identified in a second image, wherein the corresponding portion includes less noise than the first portion. One or more filter parameters of the first portion are determined based upon, at least in part, the first portion and the corresponding portion. At least a portion of the noise from the first portion is smoothed based upon, at least in part, the one or more filter parameters. At least a portion of face specific details from the corresponding portion is added to the first portion.

One or more of the following features may be included. Smoothing may include a bilateral filter. The one or more filter parameters may include a noise level associated, at least in part, with the first portion and the corresponding portion. One or more faces in a plurality of images may be detected, wherein the plurality of images may include at least one of the first image and the second image. The one or more faces may be clustered. At least a portion of the one or more faces in the plurality of images may be aligned using one or more facial landmarks. Adding at least the portion of face specific details from the corresponding portion to the first portion may include decomposing at least the corresponding portion to a base layer and a detail layer. A detail patch of at least one of the first portion and the corresponding portion may be modeled with a non-parametric Markov random field. The non-parametric Markov random field may be solved with a texture optimization framework.

In another implementation, a computing system includes a processor and a memory configured to perform operations comprising identifying a first portion of a facial image in a first image, wherein the first portion includes noise. A corresponding portion of the facial image is identified in a second image, wherein the corresponding portion includes less noise than the first portion. One or more filter parameters of the first portion are determined based upon, at least in part, the first portion and the corresponding portion. At least a portion of the noise from the first portion is smoothed based upon, at least in part, the one or more filter parameters. At least a portion of face specific details from the corresponding portion is added to the first portion.

One or more of the following features may be included. Smoothing may include a bilateral filter. The one or more filter parameters may include a noise level associated, at least in part, with the first portion and the corresponding portion. One or more faces in a plurality of images may be detected, wherein the plurality of images may include at least one of the first image and the second image. The one or more faces may be clustered. At least a portion of the one or more faces in the plurality of images may be aligned using one or more facial landmarks. Adding at least the portion of face specific details from the corresponding portion to the first portion may include decomposing at least the corresponding portion to a base layer and a detail layer. A detail patch of at least one of the first portion and the corresponding portion may be modeled with a non-parametric Markov random field. The non-parametric Markov random field may be solved with a texture optimization framework.

In another implementation, a computer program product resides on a computer readable storage medium that has a plurality of instructions stored on it. When executed by a processor, the instructions cause the processor to perform operations comprising identifying a first portion of a facial image in a first image, wherein the first portion includes noise. A corresponding portion of the facial image is identified in a second image, wherein the corresponding portion includes less noise than the first portion. One or more filter parameters of the first portion are determined based upon, at least in part, the first portion and the corresponding portion. At least a portion of the noise from the first portion is smoothed based upon, at least in part, the one or more filter parameters. At least a portion of face specific details from the corresponding portion is added to the first portion.

One or more of the following features may be included. Smoothing may include a bilateral filter. The one or more filter parameters may include a noise level associated, at least in part, with the first portion and the corresponding portion. One or more faces in a plurality of images may be detected, wherein the plurality of images may include at least one of the first image and the second image. The one or more faces may be clustered. At least a portion of the one or more faces in the plurality of images may be aligned using one or more facial landmarks. Adding at least the portion of face specific details from the corresponding portion to the first portion may include decomposing at least the corresponding portion to a base layer and a detail layer. A detail patch of at least one of the first portion and the corresponding portion may be modeled with a non-parametric Markov random field. The non-parametric Markov random field may be solved with a texture optimization framework.

The details of one or more implementations are set forth in the accompanying drawings and the description below. Other

BRIEF DESCRIPTION OF THE DRAWINGS

Like reference symbols in the various drawings indicate like elements.

DETAILED DESCRIPTION OF ONE OR MORE EMBODIMENTS

According to some embodiments, previously captured images (e.g., photos) may contain noise that degrades the quality of the image. In particular, the facial attributes of the image that contain noise may be more noticeable. Thus, according to some embodiments, denoising process 10 may identify a user's facial portions in an image that includes the noise and further identify a user's corresponding facial portion in another previously captured image that may include less noise. Using the techniques described in greater detail below, the "cleaner" corresponding facial portions from the other image may be used by denoising process 10 to denoise the user's facial portions in the noisy image, thereby creating a more realistic image.

Figure 1:
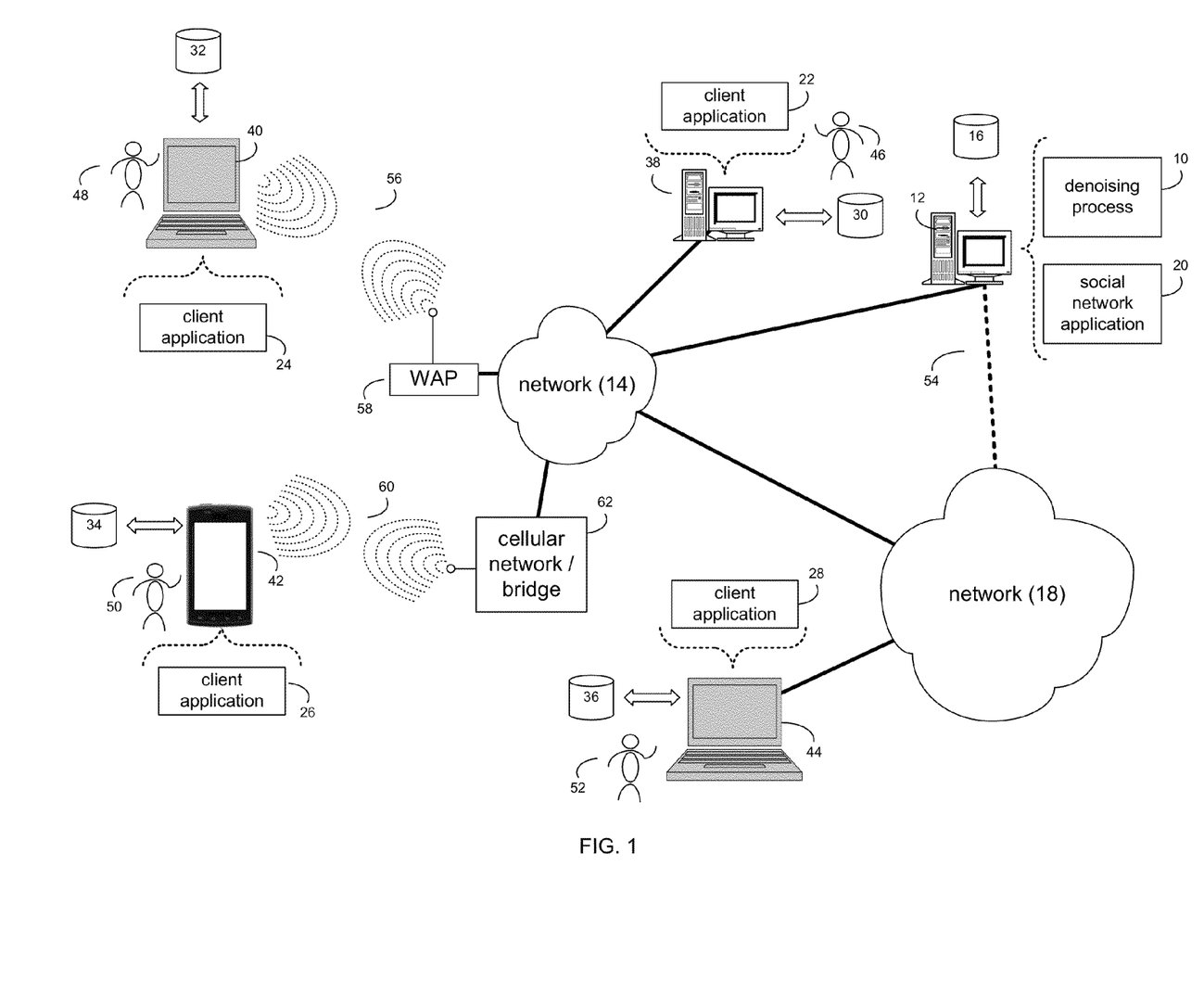
FIG. 1 is an illustrative diagrammatic view of a denoising process coupled to a distributed computing network according to one or more embodiments of the present disclosure.

Referring to FIG. 1, there is shown denoising process 10 that may reside on and may be executed by a computer (e.g., computer 12), which may be connected to a network (e.g., network 14) (e.g., the internet or a local area network). Examples of computer 12 may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to Microsoft® Windows®; Mac® OS X®; Red Hat® Linux®, or a custom operating system, for example. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, denoising process 10 may identify, by a computing device, a first portion of a facial image in a first image, wherein the first portion includes noise. A corresponding portion of the facial image may be identified in a second image, wherein the corresponding portion includes less noise than the first portion. One or more filter parameters of the first portion may be determined based upon, at least in part, the first portion and the corresponding portion. At least a portion of the noise from the first portion may be smoothed based upon, at least in part, the one or more filter parameters. At least a portion of face specific details from the corresponding portion may be added to the first portion.

The instruction sets and subroutines of denoising process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, etc.) and may be located within any suitable memory location, such as storage device 16 coupled to computer 12. In some embodiments, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Denoising process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a web server application (e.g., social network application 20), examples of which may include, but are not limited to, e.g., a video/photo management tool application, a media (e.g., video, photo, etc.) capturing application, a photo sharing application, a denoising application, or other application that allows for the improvement of video/image quality. Denoising process 10 and/or social network application 20 may be accessed via client applications 22, 24, 26, 28. Denoising process 10 may be a stand alone application, or may be an applet/application/script that may interact with and/or be executed within social network application 20. Examples of client applications 22, 24, 26, 28 may include but are not limited to a video/photo management tool application, a media (e.g., video, photo, etc.) capturing application, a photo sharing application, a denoising application, or other application that allows for the improvement of video/image quality, a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to Android™, Apple® iOS®, Mac® OS X®; Red Hat® Linux®, or a custom operating system.

One or more of client applications 22, 24, 26, 28 may be configured to effectuate some or all of the functionality of denoising process 10 (and vice versa). Accordingly, denoising process 10 may be a purely server-side application, a purely client-side application, or a hybrid server-side/client-side application that is cooperatively executed by one or more of client applications 22, 24, 26, 28 and denoising process 10.

One or more of client applications 22, 24, 26, 28 may be configured to effectuate some or all of the functionality of social network application 20 (and vice versa). Accordingly, social network application 20 may be a purely server-side application, a purely client-side application, or a hybrid server-side/client-side application that is cooperatively executed by one or more of client applications 22, 24, 26, 28 and social network application 20.

Users 46, 48, 50, 52 may access computer 12 and denoising process 10 directly through network 14 or through secondary network 18. Further, computer 12 may be connected to network 14 through secondary network 18, as illustrated with phantom link line 54. Denoising process 10 may include one or more user interfaces, such as browsers and textual or graphical user interfaces, through which users 46, 48, 50, 52 may access denoising process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14. As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth™ is a telecommunications industry specification that allows, e.g., mobile phones, computers, smart phones, and other electronic devices to be interconnected using a short-range wireless connection.

Figure 2:
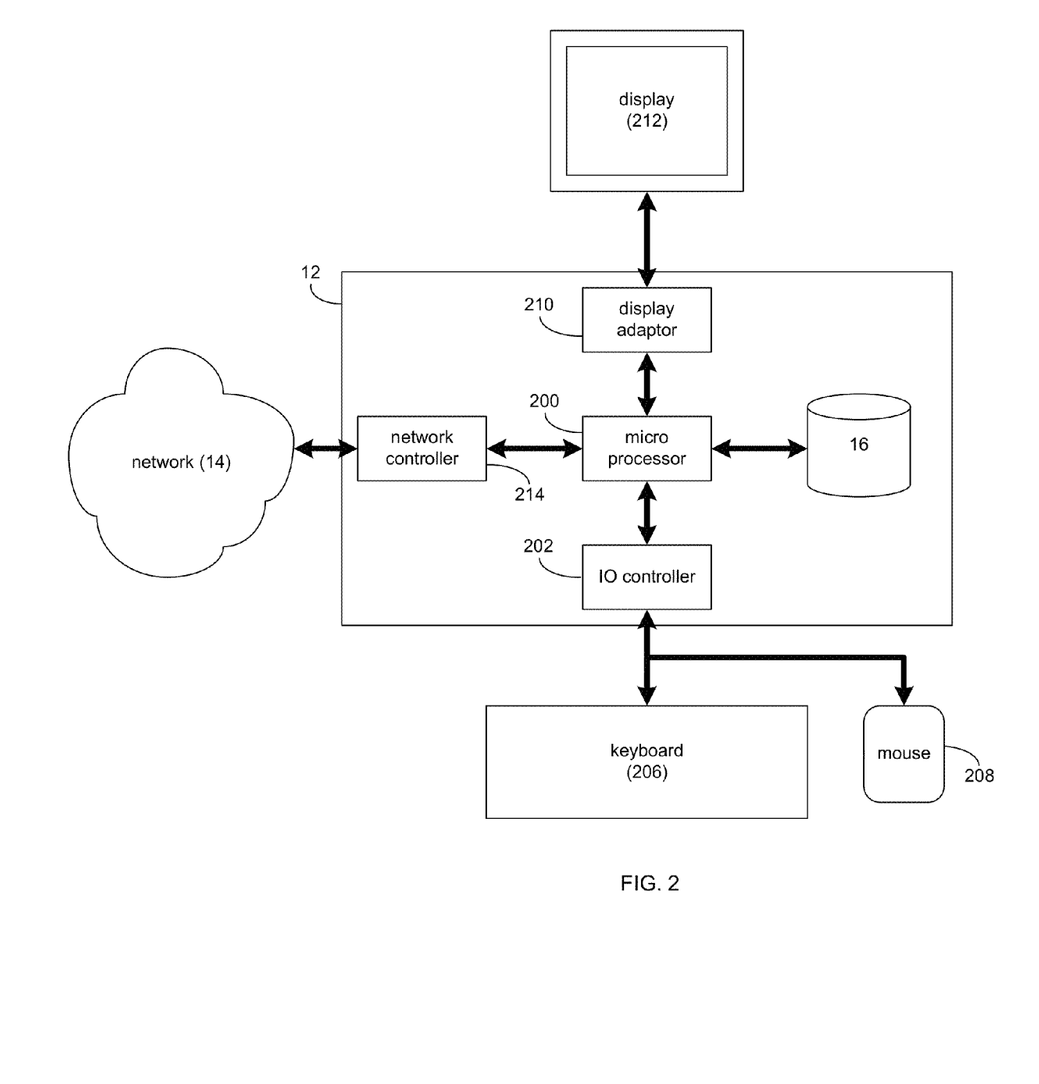
FIG. 2 is a diagrammatic view of the computer of FIG. 1 according to one or more embodiments of the present disclosure.

Referring also to FIG. 2, there is shown a diagrammatic view of computer 12. While computer 12 is shown in this figure, this is for illustrative purposes only and is not intended to be a limitation of this disclosure, as other configuration are possible. For example, any computing device capable of executing, in whole or in part, denoising process 10 may be substituted for computer 12 within FIG. 2, examples of which may include but are not limited to client electronic devices 38, 40, 42, 44.

Computer 12 may include a processor and/or microprocessor (e.g., microprocessor 200) configured to, e.g., process data and execute the above-noted code/instruction sets and subroutines of denoising process 10. Microprocessor 200 may be coupled via a storage adaptor (not shown) to the above-noted storage device 16. An I/O controller (e.g., I/O controller 202) may be configured to couple microprocessor 200 with various devices, such as keyboard 206, pointing/selecting device (e.g., mouse 208), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

As discussed above and referring also to FIGS. 3-5, denoising process 10 may identify 300, by a computing device, a first portion of a facial image in a first image, wherein the first portion includes noise. A corresponding portion of the facial image may be identified 302 in a second image, wherein the corresponding portion includes less noise than the first portion. One or more filter parameters of the first portion may be determined 304 based upon, at least in part, the first portion and the corresponding portion. At least a portion of the noise from the first portion may be smoothed 306 based upon, at least in part, the one or more filter parameters. At least a portion of face specific details from the corresponding portion may be added 308 to the first portion.

Figure 4:
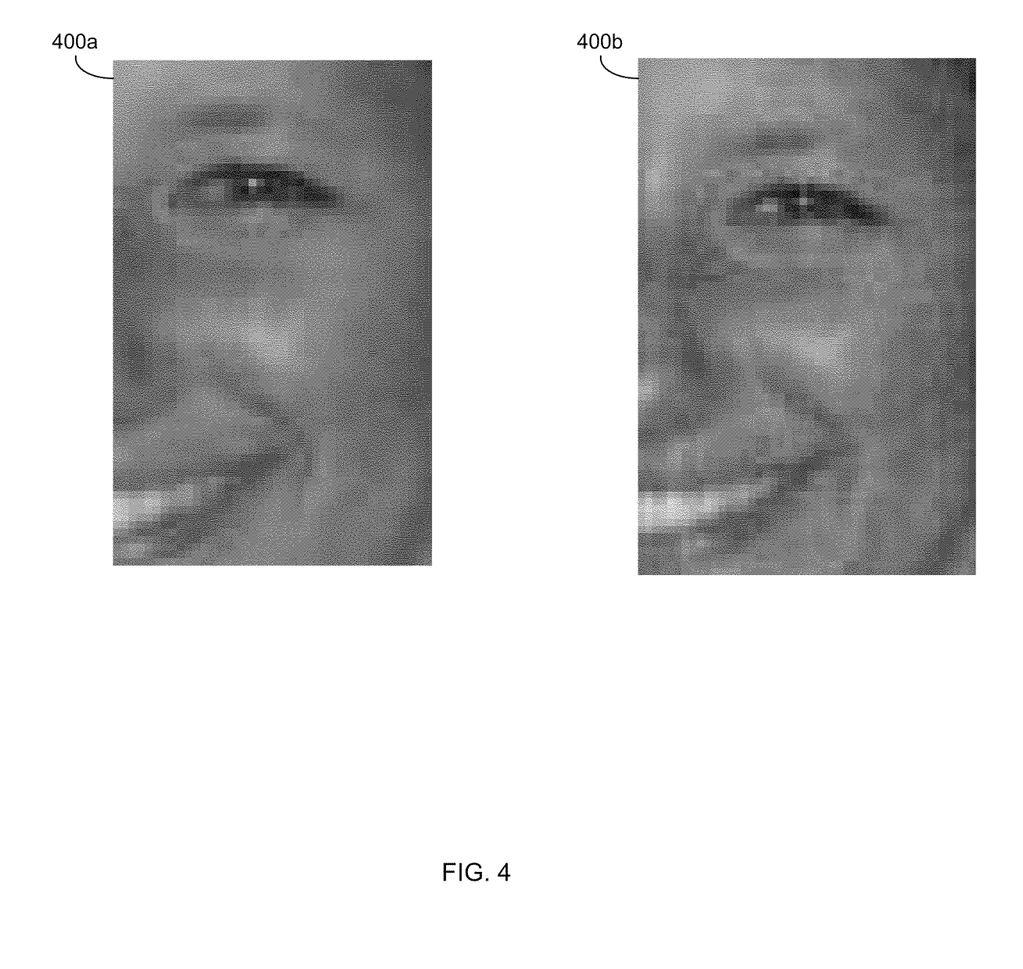
FIG. 4 is an illustrative side by side difference of a noisy and clean image according to one or more embodiments of the present disclosure.

For instance, assume for example purposes only that a user (e.g., user 50) has taken multiple images of other people including user 50 using, e.g., a built-in camera of client electronic device 42. In some embodiments, the images may be stored internally via storage device 34 and/or may be uploaded (e.g., automatically and/or manually) from client electronic device 42 to be stored remotely at the above-noted data store at storage device 16 using known techniques. The images may be organized and/or shared on a social network website via social network application 20. As will be appreciated, one or more of the images (e.g., image 400a) that include user 50 may have been taken under adequate environmental conditions such that the face of user 50 in the images are considered to have little or no noise (i.e., the facial portion of the images is considered "clean" and natural looking). One or more of the images (e.g., image 400b) that include user 50 may have been taken under less adequate environmental conditions (e.g., low light) such that the face of user 50 in these images are considered to have more noise and appear less natural.

In some embodiments, to help denoise or "clean up" image 400b to appear more natural like image 400a, denoise process 10 may detect 312 one or more faces in a plurality of images, wherein the plurality of images may include at least one of the first image (e.g., 400b) and the second image (e.g., 400a). According to some embodiments, denoising process 10 may detect 312 images 400a and/or 400b from storage device 16 (e.g., organized in an album of a social network account associated with user 50 via social network application 20). Additionally/alternatively, denoising process 10 may detect 312 images 400a and/or 400b from storage device 34 directly from client electronic device 42 (e.g., via client application 26).

Figure 5:
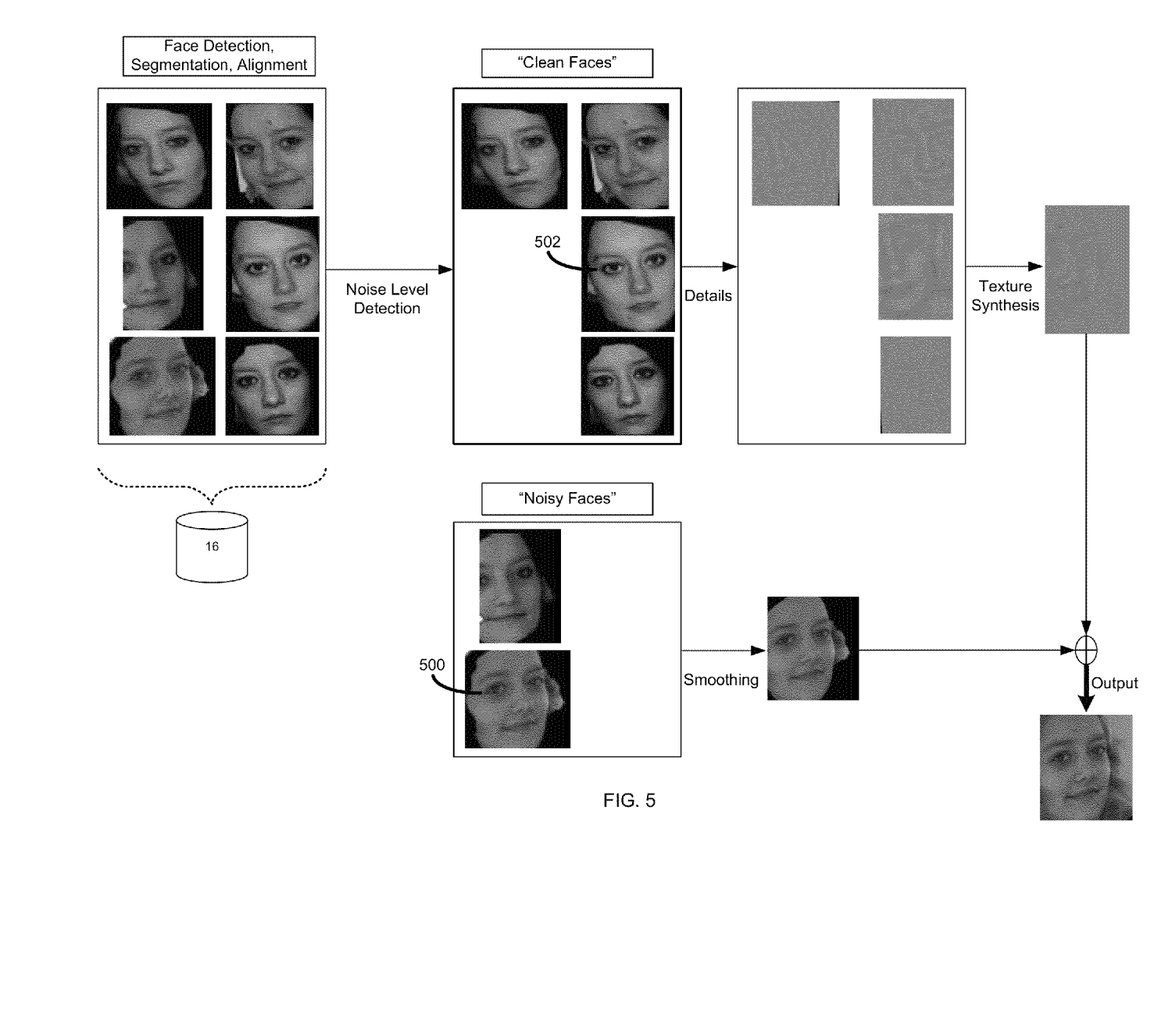
FIG. 5 is an illustrative clustering technique according to one or more embodiments of the present disclosure.

Denoise process 10 may include a face detection Application Programming Interface (API) known to those skilled in the art to detect some or all of the images of various users that may be included in the album (and/or storage device 34). In some embodiments, denoise process 10 may cluster 314 one or more faces using the face detection API. For example, denoise process 10 may cluster 314 all the faces detected to be user 50 and may cluster 314 all the faces detected to be another user in the album and/or storage device 34. An example of the clustering 314 of a user is illustrated in FIG. 5.

In some embodiments, denoise process 10 may assume the largest face cluster is the album owner's face (e.g., user 50), and may discard any other face clusters from other users. In some embodiments, e.g., where there is not at least a second image that includes user 50 or an insufficient number of images that include user 50, one or more images that include a user other than user 50 (e.g., users with similar facial features) may also be used in the clustering process. Denoise process 10 may segment the face region by, e.g., a Grabcut algorithm or other appropriate algorithm. In some embodiments, denoise process 10 may use the respective bounding box(es) as an initial foreground, and iteratively segment the face region. As will be discussed in greater detail below, at least a portion of the one or more faces in the plurality of images may be aligned 316 by denoise process 10 using one or more facial landmarks. For example, denoise process 10 may align 316 all faces to a single randomly choose template by, e.g., using an affine transform, and using respective facial landmarks between the image and the template as an alignment correspondence.

As will be discussed in greater detail below, denoising process 10 may identify 300 a first portion (e.g., patch, pixel, etc.) of a facial image in a first image (e.g., image 500), wherein the first portion may include noise as discussed above. As will also be discussed in greater detail below, denoising process 10 may identify 302 a corresponding portion (e.g., patch, pixel, etc.) of the facial image in a second image (e.g., image 502), wherein the corresponding portion includes less noise than the first portion (e.g., in image 500).

Figure 3:
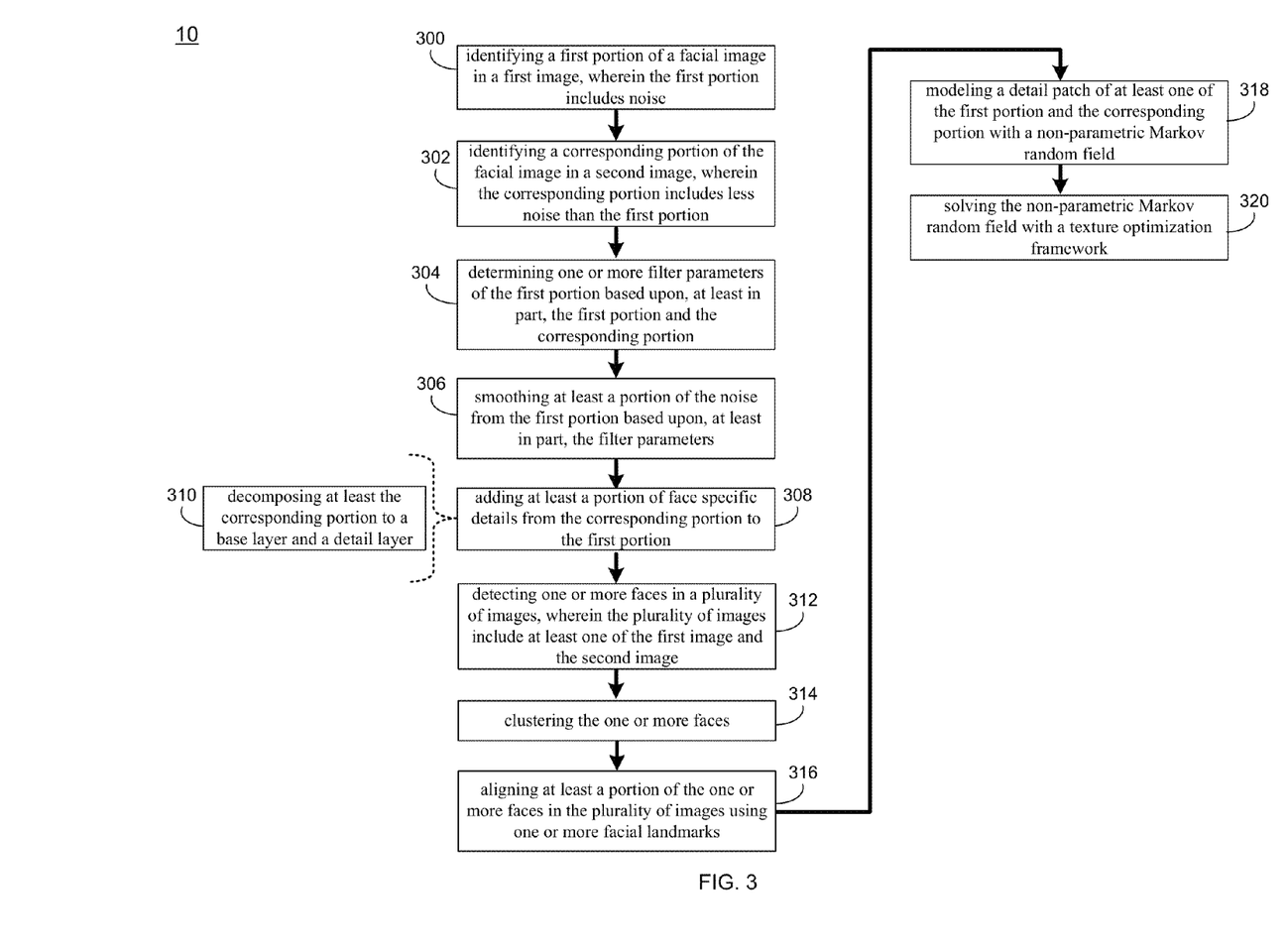
FIG. 3 is an illustrative flowchart of the denoising process of FIG. 1 according to one or more embodiments of the present disclosure.

One or more filter parameters of the first portion may be determined 304 by denoising process 10 based upon, at least in part, the first portion and the corresponding portion. The one or more filter parameters may include, for example, a noise level associated, at least in part, with the first portion and the corresponding portion.

In some embodiments, denoising process 10 may determine 304 the noise level for some or every face image $G_i$. For example, denoising process 10 may model the noise by $$G_i = n + G^c_i \quad (1)$$

where n is a noise layer and $G^c_i$ is the clean image. In some embodiments, the noise level may be defined as, e.g., Var(n), and assume n is zero mean and Var(n) is constant within a single face image. In the example, the independency between noise and image content may be assumed, and so $Var(G_i) = Var(n) + Var(G^c_i)$.

Generally, directly computing the noise level for general cases may be difficult, since distinguish noise from the image content may be difficult. In the example, since the above-described images may be restricted to user's faces which should share relatively the same image content (i.e., the user's face may be assumed to be relatively unchanged between images), denoising process 10 may determine 304 the noise (e.g., relative noise) level between each image pair. For instance, denoising process 10 may determine the relative noise levels between all image pairs, and form an example fully connected graph where each node may represent an image $G_i$ and each edge may represent the relative noise $R_{ij}$ between $G_i$ and $G_j$. Denoising process 10 may determine the absolute noise level $N_i$ using, e.g., least squares optimization.

To determine $R_{ij}$, denoising process 10 may find the top k corresponding patches $p_{ji}$ on $G_j$ for each patch $p_i$ on $G_i$, and determine the relative noise level of this patch by, e.g., $$r_{i,j,p} = \frac{1}{k} \sum_{l=1}^{l=k} w_{ij}[\operatorname{Var}(p_i) - \operatorname{Var}(p_{jl})] \quad (2)$$

where p is, e.g., 16-by-16. An example as to how to find the top k corresponding patches and their weights $w_{ij}$ will be discussed further below, as the same or similar framework may be used by denoising process 10 for facial detail synthesis. Continuing with the example, denoising process 10 may set k=3. In some embodiments, denoising process 10 may determine the relative noise level by, e.g., averaging across all patches in the above-noted face region, $$R_{i,j} = <r_{i,j}>_p, p \in \text{face} \quad (3)$$

Denoising process 10 may in some embodiments, only compute $R_{ij}$ if i>j, and set $R_{ij} = -R_{ij}$ if i<j.

Continuing with the above example, denoising process 10 may determine the absolute noise level $N_i$ by minimizing the following example cost function:

$$\{N_i\} = \operatorname{argmin} \sum_{i,j,i \neq j} w_{i,j}(N_i - N_j - R_{ij})^2 \quad (4)$$

where $w_{ij}$ is the weight of edge $R_{ij}$. $w_{ij}$ may be used to model the confidence of relative noise level $R_{ij}$ estimation. In some embodiments, denoising process 10 may use a least squares norm between the images to model the confidence, and $w_{ij} = 1/(\|G_i - G_j\|_1 + \epsilon)$. In some embodiments, denoising process 10 may set c=0.05. Eq. 4 may be under-determined. In some embodiments, denoising process 10 may prompt user 50 to annotate one or more images as clean images, and force those image $G_i^*$ to be zero noise. Eq. 4 may become a constraint problem:

$$\min \sum_{i,j,i \neq j} w_{i,j}(N_i - N_j - R_{ij})^2, \quad (5)$$
$$\text{s.t. } N_{i^*} = 0$$

Denoising process 10 may solve Eq. 6 by solving the following example linear equations:

$$MN = B \quad (6)$$

where in Eq. 7/8

$$M_{i,j} = \begin{cases} -w_{ij} & \text{if } i \neq j \\ \sum_j w_{ij} & \text{if } i = j \end{cases} \quad (7)$$
$$i, j \notin i^*$$

$$\quad (8)$$

and in Eq. 9

$$B_i = \sum_j w_{ij} R_{ij}, \; i \notin i^* \quad (9)$$

In some embodiments, denoising process 10 may operate under the example assumption that $Var(G_i^c)$ is the same across all faces, but this may or may not hold assuming different lighting conditions or different cameras are used between images. Hence, denoising process 10 may normalize the lighting by, e.g., randomly selecting a reference image as the above-noted template, and then for each image $G_i$, denoising process 10 may compute normalized image $G_i^n$, by $$G_i^n(\text{row,col}) = A_i G_i(\text{row,col}) + b_i \quad (10)$$

where $A_i$ and $b_i$ is the color transfer matrix and vector between $G_i$ and the template. In some embodiments, denoising process 10 may compute the noise level using $G_i^n$ instead of $G_i$. For example, suppose the noise term for $G_i$ is a random variable $n = (n_R, n_G, n_B)^T$. Then the normalization may change the sum of the R, G, and B noise variances of n from $n^T n$ to $n^T A_i^T A_i n$, where n is the original noise in Eq. 1. In some embodiments, denoising process 10 may assume that the noise of the three channels are independent and have the same variance, then the gain $g_i$ is the average of the Eigen values of $A_i^T A_i$. Hence, denoising process 10 may divide the result of the least squares optimization from $g_i$ to determine the final noise level.

At least a portion of the noise from the first portion may be smoothed 306 based upon, at least in part, the one or more filter parameters noted above. For example, in some embodiments, denoising process 10 may declare those images with $N_i > 0$ to be noisy, and $N_i \leq 0$ to be clean. Based on the estimated noise level, denoising process 10 may adaptively smooth 306 or filter $G_i$ if it is noisy. Smoothing 306 may include the use of, e.g., a bilateral filter, with example empirical formula space sigma $\sigma_s = 2\sqrt{N_i}$ and range sigma $\sigma_r = 8\sqrt{N_i}$.

As can be appreciated by those skilled in the art, bilateral filtering (e.g., smoothing) may remove the noise from the noisy "target" face, but may also remove important face specific details, and may produce unrealistic, over-flat faces. The smoothed image may be referred to as a target image. To enrich the visual appearance, denoising process 10 may add 308 at least a portion of face specific details from the above-noted corresponding portion to the first portion (e.g., of the target image). For example, denoising process 10 may synthesize the face specific detail from the clean face images and add 308 it to the filtered target.

Adding 308 at least the portion of face specific details from the corresponding portion to the first portion (e.g., of the target image) may include decomposing 310 at least the corresponding portion to a base layer and a detail layer. For example, denoising process 10 may decompose 310 some or all clean images (e.g., in the above-noted album) to one or more base layers and one or more detail layers using the above-noted bilateral filter with an example fixed $\sigma_s = 14$ and $\sigma_r = 38$. The base layer(s) may be the output of the bilateral filter, and the detail layer(s) may be the difference between original input. In some embodiments, denoising process 10 may collect some or all clean details as one or more inputs for the detail synthesis.

In some embodiments, e.g., for a patch at location i on the target image, denoted as $t_{s,i}$, denoising process 10 may synthesize the associated detail patch $t_{d,i}$. A detail patch(es) of at least one of the first portion and the corresponding portion may be modeled 318 with a non-parametric Markov random field as below, $$t_{d,i} = \text{argmin} \sum_i \|t_{s,i} - u_{s,i}\|^2 + \sum_{j, p_i \cap p_j \neq \phi} \|t_{d,i} - t_{d,j}\|^2 \quad (11)$$

where $t_{d,i}^*$ may be sampled by denoising process 10 from input details, and $u_{s,i}$ is the base patch (e.g., smoothed patch) associated with $t_{d,i}$ in clean inputs, $p_i$ and $p_j$ are patch i and patch j, and the second cost term, in some embodiments, only considers the overlapping region between patch i and j.

Denoising process 10 may solve 320 the non-parametric Markov random field, e.g., with a texture optimization framework. For example, $t_{d,i}$ may be initialized by denoising process 10 minimizing the least squares norm between $t_{s,i}$ and $u_{s,i}$. Denoising process 10 may merge the patches to generate a new detail layer as a current detail layer. In some embodiments, denoising process 10 may look for a new detail patch $t^{new}_{d,i}$ from clean details by, e.g., minimizing the following example energy function:

$$E = \|t_{s,i} - u_{s,i}\|^2 + \|t_{d,i}^{current} - t_{d,i}^{new}\|^2 \quad (12)$$

In some embodiments, denoising process 10 may merge the new detail patches to form one or more new detail layers. In some embodiments, denoising process 10 may iterate the above procedure multiple times to obtain one or more final detail layers.

In the above example(s), assume that the faces are roughly aligned. In some embodiments, this may allow denoising process 10 to restrict the searching space within a local window (not shown) centered at i on each input image. In the example, the patch size may be 16-by-16, the distance between each patch may be, e.g., 4 pixels, the searching window size may be, e.g., 31-by-31, and denoising process 10 may iterate the above procedure, e.g., 5 times. Those skilled in the art will appreciate that the patch sizes, distance, search window size, number of iterations, as well as other variables, may vary without departing from the scope of the disclosure.

In some embodiments, the output pixel of the detail layer at x, denoted by $p_x$ may be determined by denoising process 10 by merging some or all patches that overlaps x:

$$p_x = \sum_{i, x \in t_{d,i}} w_{x,i} t_{d,i} \quad (13)$$

where $w_i$ is the weight of patch $t_{d,i}$. Denoising process 10 may set the weight to be a function of energy E in Eq. 12, e.g. $w_{x,i} = \exp(-E_i)/\Sigma_i \exp(-E_i)$. In some embodiments, for example, there may be artifacts due to the misalignment between the above-noted detail layer and the above-noted target layer. If it is assumed for example purposes only that human eyes may be more sensitive to artifacts in flat regions, such as the cheek, rather than texture regions, denoising process 10 may set the weighting to be, e.g., $$w_{x,i} = \frac{\exp^{-kE_i/g_x}}{\sum_i \exp^{-kE_i/g_x}} \quad (14)$$

where $g_x$ is the local gradient at x, and k is an example constant chosen to be, e.g., 0.1. $g_x$ may be determined by denoising process 10 by local variance of the target image within a window (not shown) centered at x. In some embodiments, a lower local gradient, which may represent flat regions, may result into weighting function $w_i(E_i)$ of narrow bandwidth, and so denoising process 10 may reject patches of higher energy. Thus, in some embodiments, denoising process 10 may only merge flat regions with patches of higher confidence, which may result in less artifacts. In the example, denoising process 10 may set the window size to be 16-by-16.

Referring again to the above discussed noise level determination 304, denoising process 10 may pick up the top k corresponding patches to estimate the relative noise level. In some embodiments, denoising process 10 may iterate the above procedure, e.g., 3 times, within the above-noted image pair, and pick up the patches of the k least energy. Denoising process 10 may use Eq. 14 to determine the weight for each patch, and may set the search window (not shown) size to be, e.g., 22-by-22 throughout.

In some embodiments, denoising process 10 may involve multi-level details. For example, for noise level determination 304, denoising process 10 may use the algorithm as described for solving Eq. 12. For texture synthesis, denoising process 10 may derive, e.g., 3 base-detail image pairs from each input image, where each pair may be created using one or more different filtering parameters. For instance, an album with L input images may have, e.g., 3L base-detail pairs. In some embodiments, denoising process 10 may treat each base-detail pair independently. In particular, the base layer at $i^{th}$ level $B_i$ may be $$B_i = BF(B_{i-1}, \sigma_s = 2^i \sigma_{s0}, \sigma_r = 2^{-i} \sigma_{r0}) \quad (15)$$

where BF is bilateral filter, and $B_0 = G$ the original image. The corresponding $i^{th}$ detail layer is $D_i = G - B_i$. In the example, denoising process 10 may use 3 levels, and set $\sigma_{s0} = 14$ and $\sigma_{r0} = 38$.

To improve the patch search and identification 300/302, denoising process 10 may apply a domain adaptation between the input base images and the target image. For example, denoising process 10 may use the target image G as the reference and do histogram matching on input base images $B_i$. In Eq. 12, the $u_{s,i}$ may come from the 3 base images B, and the $t_{d,i}$ may come from the three detail images $D_i$. In noise level determination 304, denoising process 10 may use a linear transform for domain adaptation, and may use histogram matching in texture synthesis, since, e.g., linear transforms may help denoising process 10 to estimate noise gain for the noise level determination.

Those skilled in the art will appreciate that any of the above-described processes may take place at any time. For example, in response to client electronic device 42 capturing an image, denoising process 10 via client application 26 executing on client electronic device 42 may, e.g., automatically upload the image to computer 12, where denoising process 10 may identify 300 the first portion of the facial image in the image, identify 302 the corresponding portion of the facial image in one or more other images (e.g., in one or more online albums), determine 304 one or more filter parameters of the first portion, smooth 306 at least a portion of the noise from the first portion, and add 308 at least a portion of face specific details from the corresponding portion to the first portion. Additionally/alternatively, denoising process 10 may (e.g., automatically) perform the processes in response to uploading the image to, e.g., client computer 12. Additionally/alternatively, denoising process 10 may perform the processes in response to denoising process 10 receiving a user input via a user interface (not shown) of client application 26 executing on client electronic device 42. The user interface may also enable user 50 to select which images (e.g., in an album) that denoising process 10 may use in the above-described processes. As such, the action that causes denoising process 10 to perform the processes should be taken as an example only and not to limit the scope of the disclosure. In some embodiments, after the image has been denoised, denoising process 10 may, e.g., via social network application 20, share the resulting picture with user 50 and/or other users.

While above examples are used for denoising facial portions of an image, those skilled in the art will appreciate that other portions may be denoised, such as landmarks, background, etc., without departing from the scope of the disclosure. As such, the use of denoising facial portions of an image should be taken as an example only and not to otherwise limit the scope of the disclosure.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various embodiments of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The embodiment(s) were chosen and described in order to best explain the principles of the disclosure and the practical application, and to enable others of ordinary skill in the art to understand the disclosure for various embodiment(s) with various modifications and/or any combinations of embodiment(s) as are suited to the particular use contemplated.

Having thus described the disclosure of the present application in detail and by reference to embodiment(s) thereof, it will be apparent that modifications, variations, and any combinations of embodiment(s) (including any modifications, variations, and combinations thereof) are possible without departing from the scope of the disclosure defined in the appended claims.

What is claimed is:

1. A computer-implemented method comprising:
   identifying, by a computing device, a first portion of a facial image in a captured first image, wherein the first portion includes noise;
   identifying a corresponding portion of the facial image in a separately captured second image, wherein the corresponding portion includes less noise than the first portion;
   determining a noise level across the first portion and the corresponding portion;
   smoothing at least a portion of the noise from the first portion based upon, at least in part, the noise level; and
   adding at least a portion of face specific details from the corresponding portion to the first portion.

2. A computer-implemented method comprising:
   identifying, by a computing device, a first portion of a facial image in a captured first image, wherein the first portion includes noise;
   identifying a corresponding portion of the facial image in a separately captured second image, wherein the corresponding portion includes less noise than the first portion;
   determining one or more filter parameters of the first portion based upon, at least in part, the first portion and the corresponding portion;
   smoothing at least a portion of the noise from the first portion based upon, at least in part, the one or more filter parameters; and
   adding at least a portion of face specific details from the corresponding portion to the first portion.

3. The computer-implemented method of claim 2 wherein smoothing includes a bilateral filter.

4. The computer-implemented method of claim 2 wherein the one or more filter parameters include a noise level associated, at least in part, with the first portion and the corresponding portion.

5. The computer-implemented method of claim 2 further comprising:

detecting one or more faces in a plurality of images, wherein the plurality of images include at least one of the first image and the second image;

clustering the one or more faces; and aligning at least a portion of the one or more faces in the plurality of images using one or more facial landmarks.

6. The computer-implemented method of claim 2 wherein adding at least the portion of face specific details from the corresponding portion to the first portion includes decomposing at least the corresponding portion to a base layer and a detail layer.

7. The computer-implemented method of claim 2 further comprising modeling a detail patch of at least one of the first portion and the corresponding portion with a non-parametric Markov random field.

8. The computer-implemented method of claim 7 further comprising solving the non-parametric Markov random field with a texture optimization framework.

9. A computing system including a processor and a memory configured to perform operations comprising:

identifying a first portion of a facial image in a captured first image, wherein the first portion includes noise;

identifying a corresponding portion of the facial image in a separately captured second image, wherein the corresponding portion includes less noise than the first portion;

determining one or more filter parameters of the first portion based upon, at least in part, the first portion and the corresponding portion;

smoothing at least a portion of the noise from the first portion based upon, at least in part, the one or more filter parameters; and adding at least a portion of face specific details from the corresponding portion to the first portion.

10. The computing system of claim 9 wherein smoothing includes a bilateral filter.

11. The computing system of claim 9 wherein the one or more filter parameters include a noise level associated, at least in part, with the first portion and the corresponding portion.

12. The computing system of claim 9 further comprising:

detecting one or more faces in a plurality of images, wherein the plurality of images include at least one of the first image and the second image;

clustering the one or more faces; and aligning at least a portion of the one or more faces in the plurality of images using one or more facial landmarks.

13. The computing system of claim 9 wherein adding at least the portion of face specific details from the corresponding portion to the first portion includes decomposing at least the corresponding portion to a base layer and a detail layer.

14. The computing system of claim 9 further comprising modeling a detail patch of at least one of the first portion and the corresponding portion with a non-parametric Markov random field.

15. The computing system of claim 14 further comprising solving the non-parametric Markov random field with a texture optimization framework.

16. A computer program product residing on a computer readable non-transitory storage medium having a plurality of instructions stored thereon which, when executed by a processor, cause the processor to perform operations comprising:

identifying a first portion of a facial image in a captured first image, wherein the first portion includes noise;

identifying a corresponding portion of the facial image in a separately captured second image, wherein the corresponding portion includes less noise than the first portion;

determining one or more filter parameters of the first portion based upon, at least in part, the first portion and the corresponding portion;

smoothing at least a portion of the noise from the first portion based upon, at least in part, the one or more filter parameters; and adding at least a portion of face specific details from the corresponding portion to the first portion.

17. The computer program product of claim 16 wherein smoothing includes a bilateral filter.

18. The computer program product of claim 16 wherein the one or more filter parameters include a noise level associated, at least in part, with the first portion and the corresponding portion.

19. The computer program product of claim 16 wherein the operations further comprise:

detecting one or more faces in a plurality of images, wherein the plurality of images include at least one of the first image and the second image;

clustering the one or more faces; and aligning at least a portion of the one or more faces in the plurality of images using one or more facial landmarks.

20. The computer program product of claim 16 wherein adding at least the portion of face specific details from the corresponding portion to the first portion includes decomposing at least the corresponding portion to a base layer and a detail layer.

* * * * *